Figure 1:
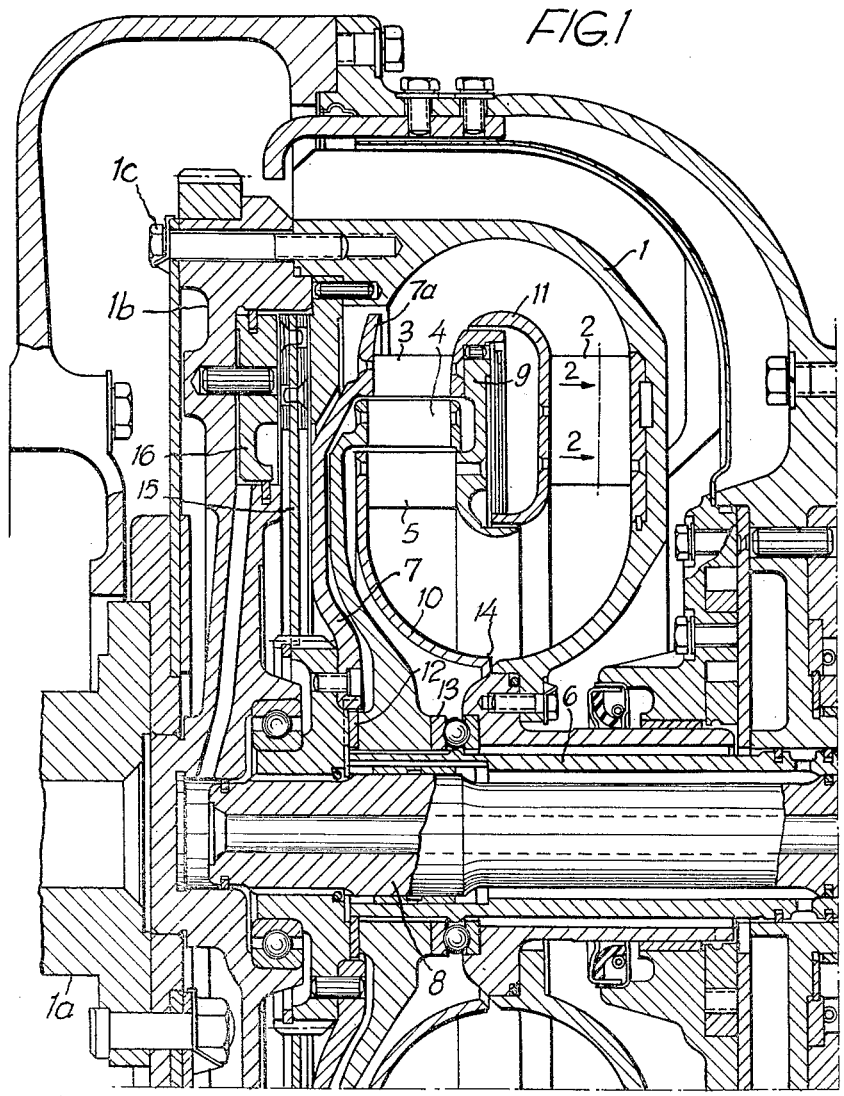

Nov. 3, 1964 SVEN-OLOF KRONOGÅRD 3,154,924
HYDRODYNAMIC TORQUE CONVERTER
Filed Dec. 22, 1959 2 Sheets-Sheet 1

INVENTOR.
Sven-Olof Kronogård
BY
Pierce, Scheffler & Parker
Attorneys

Nov. 3, 1964    SVEN-OLOF KRONOGÅRD    3,154,924
HYDRODYNAMIC TORQUE CONVERTER
Filed Dec. 22, 1959    2 Sheets-Sheet 2
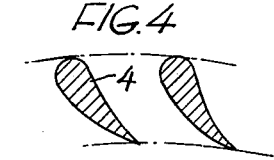
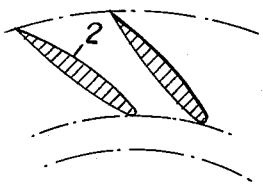
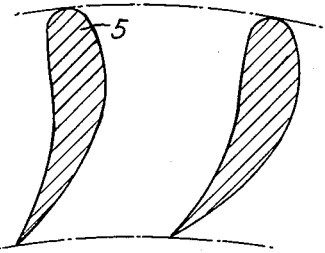
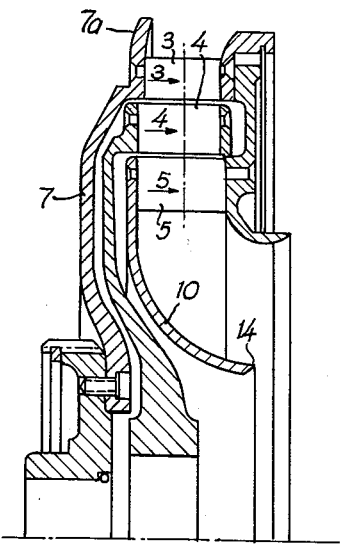
INVENTOR.
Sven-Olof Kronogård
BY
Pierce, Scheffler & Parker
attorneys 3,154,924
HYDRODYNAMIC TORQUE CONVERTER
Sven-Olof Kronogård, Goteborg, Sweden, assignor to AB
Volvo, Goteborg, Sweden, a corporation of Sweden
Filed Dec. 22, 1959, Ser. No. 861,300
Claims priority, application Sweden, Dec. 23, 1958,
11,998/58
1 Claim. (Cl. 60—54)

This invention relates to a hydrodynamic torque converter comprising a two-stage turbine, a rotatable reactor located between the turbine stages, and an impeller supported by a rotatable shell forming part of an annular chamber for receiving a working fluid.

The object of the invention is to provide an improved form of such torque converter in which the axial thrust due to the axially directed outlet of the turbine will be fully balanced. Thereby heavy thrust bearings between the rotating parts may be avoided such as to make the construction simple and compact.

The invention may be best understood from the following detailed specification taken in conjunction with the accompanying drawings. FIG. 1 is a longitudinal sectional view of a variable speed transmission adapted for motor vehicles and comprising a hydrodynamic torque converter in accordance with the invention combined with a mechanical gearing of the planetary type. FIGS. 2 to 5 are sections taken on the respectively numbered section lines of FIGS. 1 and 6, respectively, and FIG. 6 is a section of the turbine system of the hydrodynamic torque converter. In FIG. 1 numeral 1 denotes the rotary shell of a hydrodynamic torque converter, said shell being connected with the input shaft 1a of the variable speed transmission by means of a disc 1b driven by shaft 1a, the disc 1b being connected to shell 1 by a plurality of stud bolts 1c. In the toric fluid path of the converter there are provided an impeller 2, a first turbine stage 3, a reactor 4 and a second turbine stage 5. More particularly, as shown in FIG. 1, impeller blading 2 is located in the radial portion of the toroidal path remote from the input shaft 1a while the turbine bladings 3 and 5 with the reactor blading 4 are located in the radial portion of the toroidal path nearest to the input shaft. The inner and outer bend portions of the toroidal path are unbladed. Also a portion of the rotary shell 1 forms the outer wall of the outer bend portion so that there is no appreciable impulse effect exerted on the turbine disc 7 at this point. The reactor 4 is rotatable and mounted on a tubular shaft 6. The first turbine stage 3 is supported by a rotor disc 7 the hub of which is connected to an output shaft 8 disposed within the shaft 6. The second turbine stage 5 is supported by the blading of the first turbine stage 3 by means of an annular core element 9 which is secured to the tips of the blades of the turbine blade rim 3 and extends radially inward beyond the tips of the blading of reactor 4. The second turbine stage 5 has a shroud 10 which forms the outer boundary wall at the radially inner portion of the fluid path. The core of the fluid path also comprises an element 11 which is connected with the blades of the impeller and has a constant radius of curvature at the radially outer portion of the fluid path. The rotor disc 7 of the first turbine stage 3 extends outwards past the blading of this stage and forms a shroud 7a which constitutes an outer boundary wall of the fluid path in close proximity to the entrance of the first turbine stage.

The radially outer unbladed bend portion of the fluid path is formed with a contraction which amounts to between 5 and 10%. In the three blade rims 3, 4, and 5 the width of the path increases successively and also the length of the chords become greater. Due to the increase of the width of the path, the increase of the transport velocity of the oil is limited, which makes it possible to form the radially inner curved portion of the fluid path with a contraction which in turn suppresses the tendency towards separation in this curved portion of the path and also results in a more even distribution of the velocity at the entrance of the impeller 2.

As will be seen from FIG. 1 the core element 9 from the second turbine stage 5 extends past said stage with the result that the portion of the radially inner unbladed bend portion of the toroidal fluid path which is located nearest after said second turbine stage, is confined by walls which rotate together with the blade rim. Consequently, there are small flow losses and improved flow patterns, resulting in that this portion can have a small contraction or no contraction at all and yet present favourable flow conditions, and the remaining part of the total contraction may be provided in the following portion of the fluid path ahead of the entrance of the impeller 2.

The difference in pressure between the radially outer and radially inner portion of the fluid path causes a continuous leakage of oil through the gaps between the core elements 9 and 11. The gap in the inner portion of the fluid path is directed in a manner such that the flow of oil leaving said gap is substantially parallel to the direction of flow in said portion of the fluid path and will not cause turbulence but will instead further suppress the tendency towards separation.

A continuous exchange of oil takes place in the torque converter, oil leaving the converter through the space between the rotor disc 7 of the first turbine stage and the rotor disc of the reactor 4, this oil being used for effective lubrication of a thrust-washer 12 provided between the hubs of said discs. Oil is supplied through the space outside the shaft 6 and passes through a thrust bearing 13 and enters the fluid path through the gap 14 between the free edge of the shroud 10 and the shell 1 of the torque converter. The flow of oil thus supplied has an effect corresponding to a contraction of the flow of fluid, since it requires a certain area of the fluid path ahead of the impeller entrance.

Due to the fact that the boundary walls connected with the second turbine stage 5 as represented by the shroud 10 are so long as to provide for a substantially axial axis for this portion of the fluid path, the turbine system is subjected to an impulse effect which counteracts the static pressure acting on this system. More particularly, shroud 10 which is carried by turbine blading 5 forms that part of the annular chamber represented by the outer boundary wall of the fluid flow path at the inner bend portion thereof and serves to deflect fluid flow axially in the direction away from the turbine disc thereby establishing a corresponding axial thrust having a direction counter to and compensating the axial thrust established on the turbine disc. In view thereof, the bearing arrangement can be simplified, and the simple thrust washer 12 can be used as a thrust bearing between the hubs of the turbine and reactor.

The ratio of the radius of the core to the radius of the shell at the impeller entrance should be 0.40:1 to 0.45:1, whereas the corresponding ratio at the entrance of the turbine may be a little smaller, for instance 0.35:1 to 0.40:1, the resultant ratio of the width of the core to the width of the fluid path being 0.30:1 to 0.40:1.

Due to the fact that the turbine system is disposed in the portion of the torque converter nearest the engine, a direct clutch can be readily provided between the turbine and the engine shaft. To this end, the hub of the rotor disc 7 has mounted thereon a plate 15 to be actuated by an annular piston 16. Pressure fluid for engagement of the clutch is supplied through a bore in the shaft 8. In the space to the right of the piston 16 as viewed in FIG.

1 there prevails the same pressure as in the torque converter, this pressure being used for disengaging the clutch upon relief of pressure at the left side of the piston. Since the pressure in the torque converter counteracts the piston force during engagement of the clutch, it may be suitable, especially in case of great torques, to provide means to reduce the superatmospheric pressure in the torque converter to zero as soon as fluid pressure is supplied to the piston 16 for engagement of the clutch.

The torque of the second turbine stage 5 is transmitted to the output shaft 8 through the blade rim of the first turbine stage 3 which has a relatively large radius and comprises a great number of blades so that the stresses imposed thereon are comparatively small.

What I claim is:

A hydrodynamic torque converter comprising a rotatable shell forming part of an annular chamber for receiving a working fluid, an annular core in said chamber, said annular chamber and core defining a closed toroidal fluid flow path, said toroidal flow path comprising a first radially extending bladed portion whose width increases in the direction of fluid flow, a second radially extending bladed portion having flat walls, and unbladed inner and outer bend portions interconnecting said first and second radially extending portions, said inner and outer unbladed bend portions being formed with a contraction in the direction of fluid flow and said rotatable shell forming also the outer boundary wall of the toroidal flow path at said outer bend portion, an input shaft connected to said shell for rotating the same, said input shaft being located at the side of said annular chamber closest to said first radially extending portion of said toroidal flow path, impeller blades secured to said shell and constituting the blading of said second radially extending portion of said toroidal flow path, a turbine disc mounted for rotation coaxially with said input shaft, a first rim of turbine blades secured to said turbine disc and constituting part of the blading of said first radially extending portion of said toroidal flow path, said first rim of blades having an inlet directed radially inwards, an output shaft connected directly to said turbine disc, a reactor disc mounted for rotation coaxially with said input shaft and located intermediate said turbine disc and said first radially extending portion of said toroidal flow path, reactor blades secured to said reactor disc and which are also located in said first radially extending portion of said toroidal flow path and radially inwards of said first rim of turbine blades, said annular core having one element thereof secured to the tips of the blades of said first turbine blade rim and extending radially inwards beyond the tips of said reactor blades, a second rim of turbine blades located in said first radially extending portion of said toroidal flow path, said second rim of turbine blades being carried by said radially inward extending element of said core and being located radially inward of said reactor blades, and a rotatable shroud carried by said second rim of turbine blades, said shroud forming that part of said annular chamber represented by the outer boundary wall of said fluid flow path at the inner bend portion thereof and which serves to deflect the fluid flow axially in the direction away from said turbine disc thereby establishing a corresponding axial thrust having a direction counter to and compensating the axial thrust established on said turbine disc.

References Cited in the file of this patent

UNITED STATES PATENTS

| | | |
|---|---|---|
| 2,480,933 | Jandasek | Sept. 6, 1949 |
| 2,634,584 | Burnett | Apr. 14, 1953 |
| 2,690,053 | Ahlen | Sept. 28, 1954 |
| 2,690,054 | Ahlen | Sept. 28, 1954 |
| 2,691,812 | Misch | Oct. 19, 1954 |
| 2,719,616 | Ahlen | Oct. 4, 1955 |